(12) United States Patent
Shin et al.

(10) Patent No.: US 11,548,227 B2
(45) Date of Patent: Jan. 10, 2023

(54) METHOD FOR MONITORING 3D PRINTING EQUIPPED WITH 3D PRINTING SLICER AND RECURSIVE LOOP STRUCTURE

(71) Applicant: Korea Electronics Technology Institute, Seongnam-si (KR)

(72) Inventors: Hwa Seon Shin, Yongin-si (KR); Sung Hwan Chun, Seoul (KR); Hye In Lee, Anyang-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 415 days.

(21) Appl. No.: 16/499,370

(22) PCT Filed: Mar. 27, 2018

(86) PCT No.: PCT/KR2018/003573
§ 371 (c)(1),
(2) Date: Sep. 30, 2019

(87) PCT Pub. No.: WO2018/182269
PCT Pub. Date: Oct. 4, 2018

(65) Prior Publication Data
US 2020/0023586 A1    Jan. 23, 2020

(30) Foreign Application Priority Data
Mar. 31, 2017  (KR) .................. 10-2017-0041939

(51) Int. Cl.
*B33Y 50/02* (2015.01)
*B29C 64/386* (2017.01)
(Continued)

(52) U.S. Cl.
CPC ............ *B29C 64/386* (2017.08); *B22F 10/30* (2021.01); *B33Y 40/00* (2014.12); *B33Y 50/02* (2014.12)

(58) Field of Classification Search
CPC .. B22F 10/20; B22F 2999/00; B22F 2203/03; B22F 10/30; B29C 64/386; B29C 64/393;
(Continued)

(56) References Cited

U.S. PATENT DOCUMENTS

| 9,308,690 B2* | 4/2016 | Boyer | ................... B29C 64/10 |
| 2015/0045928 A1* | 2/2015 | Perez | ................... B29C 64/112 |
| | | | 700/110 |
| 2016/0236414 A1* | 8/2016 | Reese | ................... B33Y 50/02 |

FOREIGN PATENT DOCUMENTS

| KR | 10-2014-0102240 A | 8/2014 |
| KR | 10-2016-0076708 A | 7/2016 |
| KR | 10-1652482 B1 | 8/2016 |

OTHER PUBLICATIONS

International Search Report dated Jul. 12, 2018 in corresponding International Patent Application No. PCT/KR2018/003573 (3 pages in English, 3 pages in Korean).

(Continued)

*Primary Examiner* — Yuhui R Pan
(74) *Attorney, Agent, or Firm* — NSIP Law (57) ABSTRACT

Provided is a method for monitoring 3D printing equipped with a 3D printing slicer and a recursive loop structure. A 3D printing method according to an embodiment of the present invention sets up a slicing environment for 3D printing of a 3D model, generates a mechanical code by performing slicing according to the setup environment, monitors the status of the 3D printing according to the generated mechanical code, and, depending on the monitoring result, determines whether or not to re-perform the setup and subsequent steps. Accordingly, by semi- or fully automating the 3D printing engineering process, the time and effort for engineering performance involving human participation are reduced, and the human resource is concentrated on a more important area, such that the effects of enhancing the 3D (Continued)

printing output quality and assuring the quality can be expected.

10 Claims, 10 Drawing Sheets

(51) Int. Cl.
*B33Y 40/00* (2020.01)
*B22F 10/30* (2021.01)

(58) Field of Classification Search
CPC ......... B33Y 40/00; B33Y 50/00; B33Y 50/02; Y02P 10/25
See application file for complete search history.

(56) References Cited

OTHER PUBLICATIONS

Korean Office Action dated Jun. 5, 2018 in corresponding Korean Patent Application No. 10-2017-0041939 (5 pages in Korean).

* cited by examiner

METHOD FOR MONITORING 3D PRINTING EQUIPPED WITH 3D PRINTING SLICER AND RECURSIVE LOOP STRUCTURE

CROSS REFERENCE TO RELATED APPLICATIONS

This application is a U.S. National Stage Application of International Application No. PCT/KR2018/003573, filed on Mar. 27, 2018, which claims the benefit under 35 USC 119(a) and 365(b) of Korean Patent Application No. 10-2017-0041939, filed on Mar. 31, 2017, in the Korean Intellectual Property Office, the entire disclosures of which are incorporated herein by reference for all purposes.

TECHNICAL FIELD

The present disclosure relates to 3D printing-related technology, and more particularly, to a method for monitoring/enhancing 3D printing.

BACKGROUND ART

Figure 1:
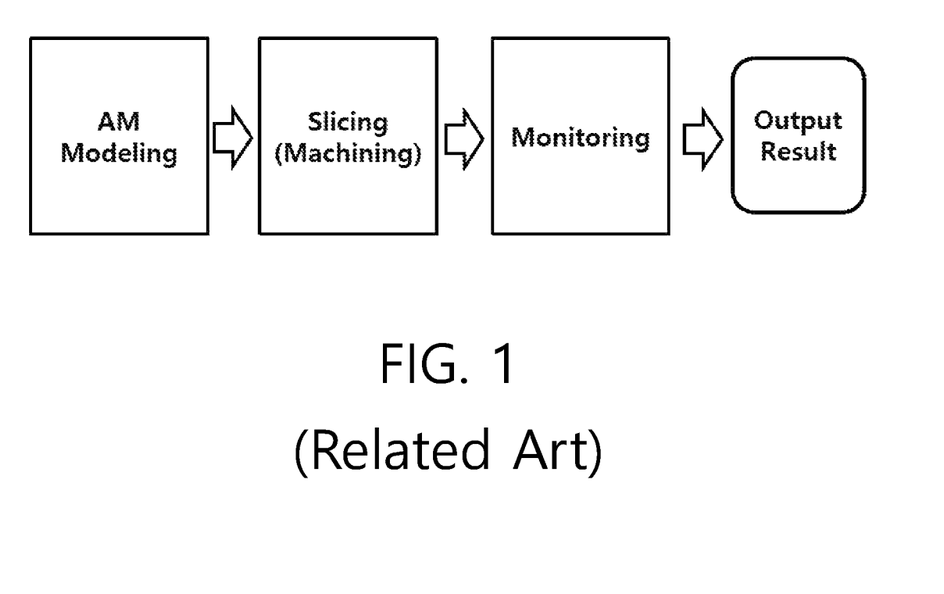
FIG. 1 is a view illustrating a 3D printing output workflow.

FIG. 1 is a view illustrating a 3D printing output workflow. The output workflow of 3D printing includes three procedures, modeling, slicing (or machining), and monitoring, as shown in FIG. 1, and these three procedures are performed in phases.

When a problem arises in an output result of 3D printing, a person should manually re-perform these procedures. For example, there may be an error in an output result, such as a gap occurring between paths scanned with laser beams or 3D printing nozzles in a process of outputting one sliced layer. In this case, a person in charge of outputting may stop 3D printing, move back to the slicing procedure, adjust parameters provided in slicer SW, and then perform 3D printing again, and may identify a progressing state.

That is, a person monitors an output result with naked eyes, and may stop outputting when there is a doubt that an error occurs in the output result, and may move to a previous step and re-perform the step. However, there may be problems in accuracy and consistency, and there may be a problem that the time required to perform 3D printing is extended.

DISCLOSURE

Technical Problem

The present disclosure has been developed in order to address the above-discussed deficiencies of the prior art, and an object of the present disclosure is to provide a method which can solve an error in an output result and find an optimum engineering condition, by automatically or semi-automatically a slicing procedure or a preceding modeling procedure based on a result of determining abnormality of the output result through a monitoring means of 3D printing equipment.

Technical Solution

According to an embodiment of the present disclosure to achieve the above-described object, a 3D printing method includes the steps of: setting up a slicing environment for 3D printing for a 3D model; generating a machine code by slicing according to the set-up environment; monitoring a 3D printing condition according to the generated machine code; and determining whether to re-perform the step of setting-up according to a result of monitoring.

In addition, the step of determining may determine to re-perform the step of setting up when an error occurs as a result of 3D printing.

In addition, the 3D printing method according to an embodiment of the present disclosure may further include a step of storing the environment set-up at the step of setting-up as an optimum process setup when an error does not occur as a result of 3D printing.

In addition, the step of setting up may set up at least one of a parameter, a range, and a step for slicing.

In addition, the step of setting up may be automatically performed by slicer SW which is trained by machine learning based on data collected through a previously performed setup step and a monitoring step.

In addition, the 3D printing method according to an embodiment of the present disclosure may further include a step of re-modeling regarding the 3D model according to a result of monitoring.

In addition, the step of re-modeling may re-model based on at least one of an item set by a user and an automatic setup item.

A computing system according to another embodiment of the present disclosure includes: a communication unit configured to connect communication with 3D printing equipment; and a processor configured to set up a slicing environment for 3D printing for a 3D model, to generate a machine code by slicing according to the set-up environment, to monitor a 3D printing condition of the 3D printing equipment according to the generated machine code, and to determine whether to re-perform the step of setting-up according to a result of monitoring.

Advantageous Effects

According to embodiments of the present disclosure as described above, by semi- or fully automating the 3D printing engineering process, the time and effort for engineering performance involving human participation are reduced, and human resources are concentrated on more important areas, such that the effects of enhancing 3D printing output quality and assuring the quality can be expected.

3D printing is technology that can bring about great change in overall industry, but is not actively utilized so far. This is mainly because quality of output is not satisfied and technology assuring the quality is not significantly developed. According to embodiments of the present disclosure, since quality of output can be enhanced and the quality can be assured, the present disclosure can contribute to development of 3D printing industry and new market creation.

In addition, according to embodiments of the present disclosure, the effects of enhancing technology by assuring technology in phases according to an order required in the industrial settings can be expected.

BEST MODE

Hereinafter, the present disclosure will be described in detail with reference to the accompanying drawings.

1. 3D Printing Workflow

Figure 2:
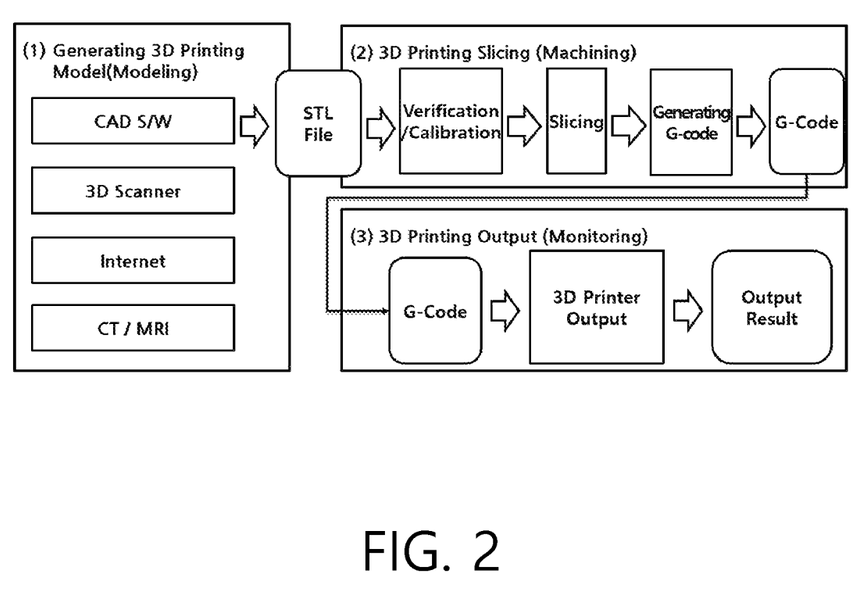
FIG. 2 is a view illustrating a 3D printing workflow in detail.
Figure 3:
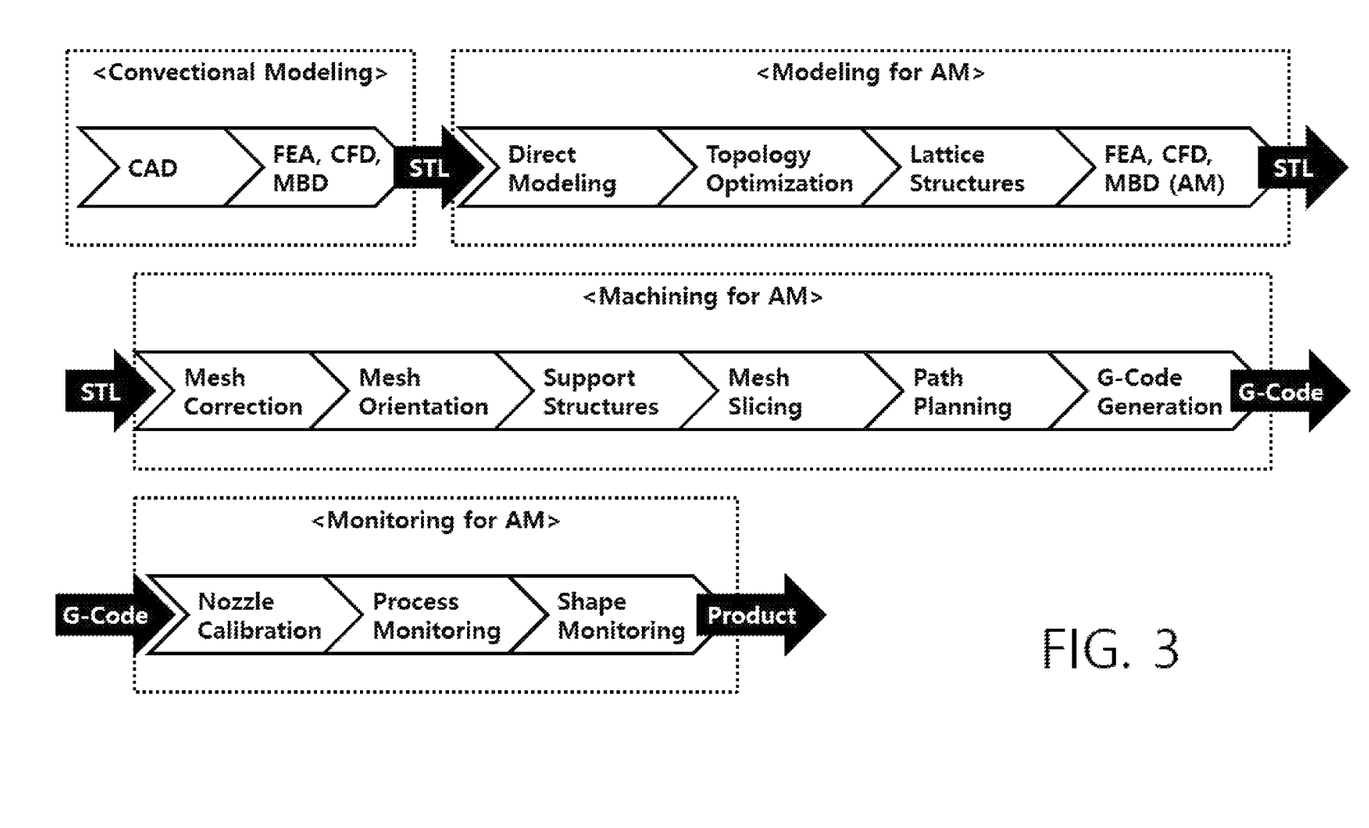
FIG. 3 is a view illustrating technical details of 3-M steps of 3D printing.

FIG. 2 is a view illustrating a 3D printing workflow in detail. The 3D printing workflow may be normally divided into three steps (3-M: modeling-machining-monitoring) as shown in FIG. 2. Each step is performed by a separate SW product. FIG. 3 illustrates technical details of the 3-M steps of 3D printing.

1.1. Modeling for AM

[32] The modeling step is not conventional modeling which receives CAD data as input data, and is performed by new SW which receives polygonal mash data (for example, an STL file) as input data.

The STL file is a data format which is transmitted between the modeling step and the machining step, and is not CAD data but polygonal mesh data.

As shown on the left of FIG. 2, an STL file generated in a conventional modeling tool (for example, CAD), a 3D scanner, Internet, and a CT/MRI is received as an input at the modeling step.

In addition, at the modeling step, direct modeling may be performed based on the inputted polygonal mesh data, or modeling may be performed through topology optimization and generation of lattice structures.

In this process, computer aided engineering (CAE) such as finite element analysis (FEA) based on polygonal mesh data, computational fluid dynamics (CFD), multibody dynamics (MBD), or the like is selectively performed.

1.2 Machining for AM

The machining step is an essential step for 3D printing, and refers to a process of slicing inputted 3D model data and then converting the data into a machine code (for example, a G-code) that is recognized by 3D printer equipment.

A G-code file is a data format which is transmitted between the machining step and the monitoring step, and is a machine code which has a different supporting format according to 3D printer equipment.

The machining step is a domain where elements dealing with a polygon mesh (mesh correction, mesh orientation, mesh slicing), modeling elements such as generation of support structures, and machining elements such as path planning are combined.

1.3 Monitoring for AM

The monitoring step is a step of monitoring an output process and an output shape in the 3D printer equipment.

At the monitoring step, alignment of nozzles or laser beams (nozzle calibration) which is a basis for 3D printing, process monitoring for observing an output process, shape monitoring for comparing an original 3D model and an outputted shape, and the like are performed.

2. Method for Enhancing 3D Printing Based on Feedback Between 3D Printing Steps

Figure 4:
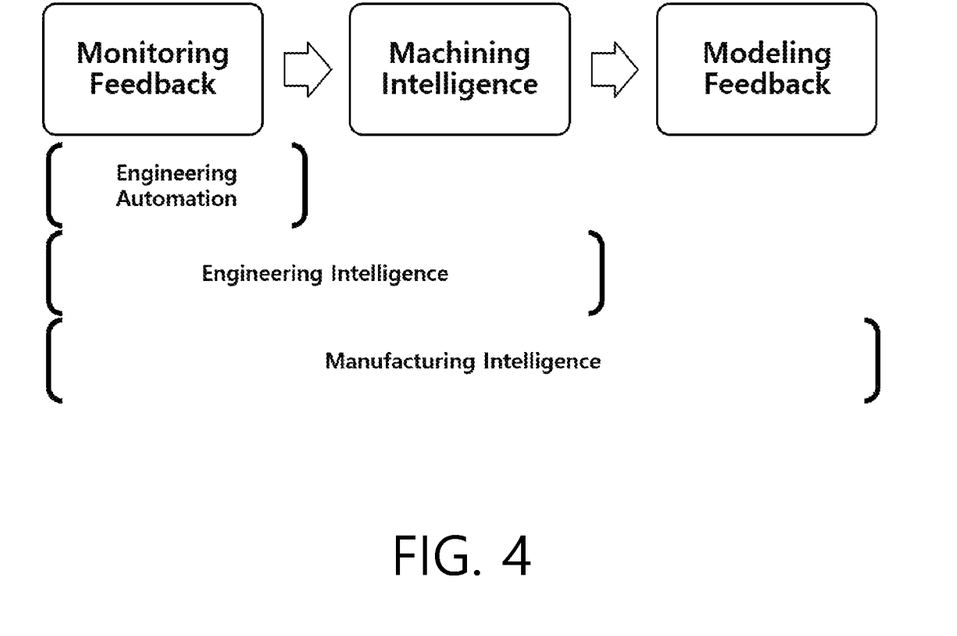
FIG. 4 is a view provided to explain an overall concept of an embodiment of the present disclosure.

FIG. 4. is a view provided to explain an overall concept of an embodiment of the present disclosure. To enhance 3D printing quality, an embodiment of the present disclosure suggests 1) monitoring feedback, 2) big data machine learning, and 3) modeling feedback. These will be described hereinafter one by one.

2.1 Monitoring Feedback

Figure 5:
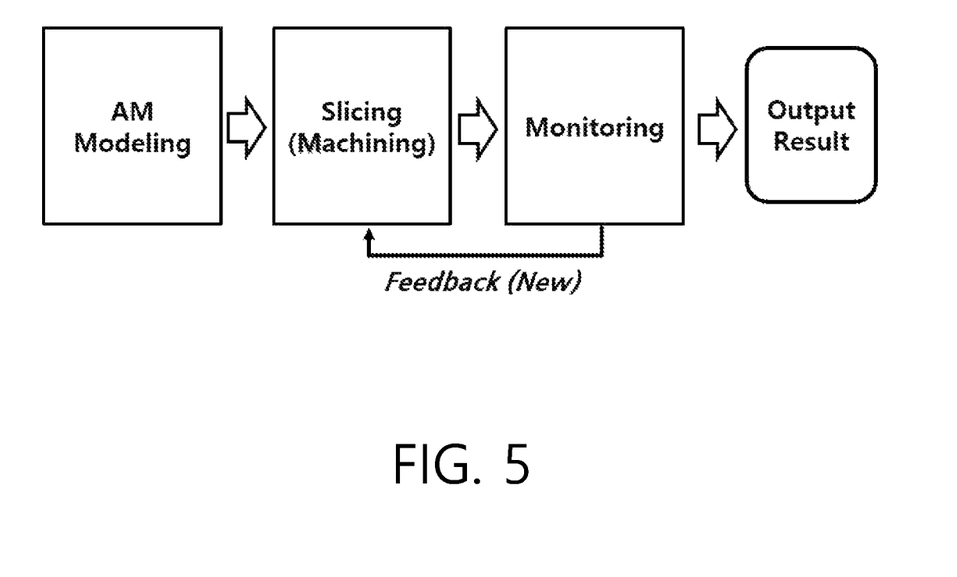
FIG. 5 is a view provided to explain a concept of monitoring feedback.

Monitoring feedback is a technical constitution for engineering automation. FIG. 5 is a view provided to explain a concept of monitoring feedback.

As shown in FIG. 5, a feedback step is provided between the slicing step and the monitoring step. When an error occurs in a preceding output process, an auto pilot procedure is performed according to a process parameter, a range, and a step value designated by a user, based on this feedback step, to move back to the slicing step in phases, to re-generate a machine code (for example, a G-code), and then to re-operate output.

A type of the process parameter designated by the user may vary according to an output method, a material, equipment characteristics of a 3D printer, and types of critical process parameters may be provided as follows with reference to a metal 3D printer (SLM method) using lasers:

laser power
beam diameter (or nozzle size)
scan speed (or nozzle speed)
layer thickness
hatching distance (or extruder width)
scanning strategy (or hatching strategy/pattern)
packing density Since an energy density is inversely proportional to speed, hatching distance, layer thickness, and is proportional to power as shown in the following equation, initial engineering is focused on optimization of these parameters:

$$E = \frac{P}{v \cdot h \cdot t}$$

P: power, v: speed, h: hatching distance, t: layer thickness

Accordingly, according to an embodiment of the present disclosure, "engineering automation" whereby optimum process parameters are automatically derived only with the above-described critical process parameters is possible.

Figure 6:
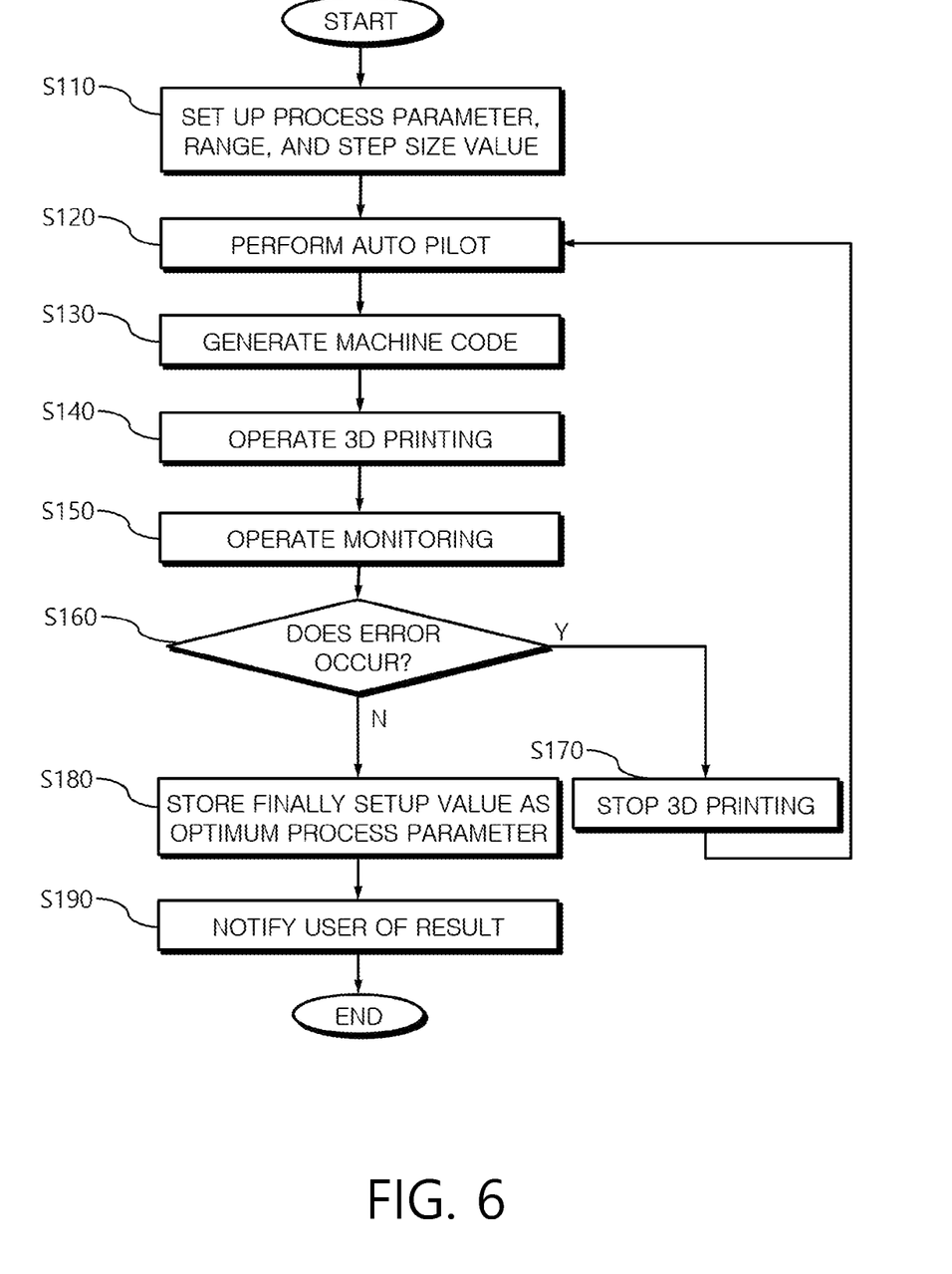
FIG. 6 is a flowchart provided to explain a working process according to a monitoring feedback method in detail.

FIG. 6 is a flowchart provided to explain a working process according to a monitoring feedback method in detail.

As shown in FIG. 6, a process parameter, a range, and a step size value for performing an auto pilot at the slicing step are set up first (S110). For example, a layer thickness range may be set to "0.3 mm to 1.0 mm", and a step size value may be set to "0.05 mm."

Next, the auto pilot is executed (S120) and a loop is operated according to the process parameter, the range, and the step size value inputted at step S110.

Specifically, a machine code is generated according to the corresponding process parameter (S130), 3D printing is operated by applying the generated machine code to 3D printing equipment (S140), and simultaneously, an output state of each layer is observed by monitoring (S150).

When an error occurs as a result of monitoring during output (S160-Y), 3D printing is stopped (S170), and step S120 is re-performed and the process parameter, the range, and the step size value are changed, and subsequent procedures are performed.

On the other hand, when an error does not occur as a result of monitoring during output, that is, outputting succeeds (S160-N), the procedure escapes from the loop, and a finally setup value is stored as an optimum process parameter (S180) and a final result is notified to a user (S190).

2.2. Big Data Machine Learning

Figure 7:
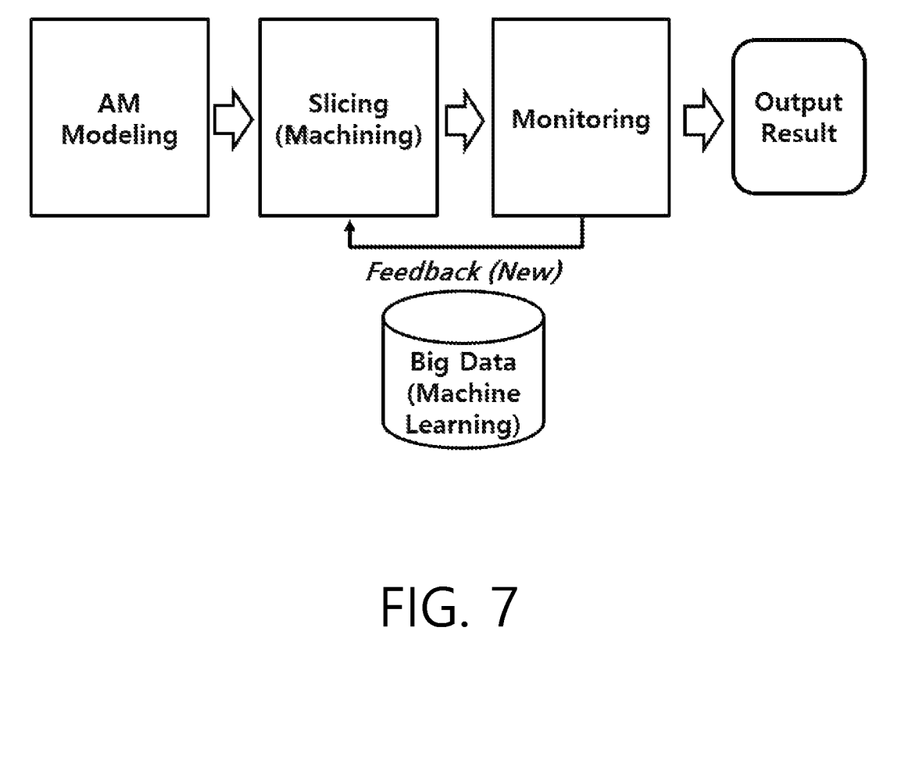
FIG. 7 is a view provided to explain a concept of big data machine learning.

Big data machine learning is a technical constitution for engineering intelligence. FIG. 7 is a view provided to explain a concept of big data machine learning.

As shown in FIG. 7, in addition to the feedback step provided between the slicing step and the monitoring step as described in "2.1 Monitoring Feedback," a step of collecting data collected at the monitoring step and the auto pilot step, storing the data as big data, and training slicer SW by machine learning based on the big data is performed.

Through this step, the slicer SW which becomes intelligent may perform the auto pilot step by automatically determining a type of a process parameter to be optimized, and a range and a step size value thereof by itself, without the step of changing the process parameter, the range, and the step size value designated by the user, as described in "2.1 Monitoring Feedback," and through this, "engineering intelligence" whereby engineering can be optimized with almost no human intervention is possible.

Figure 8:
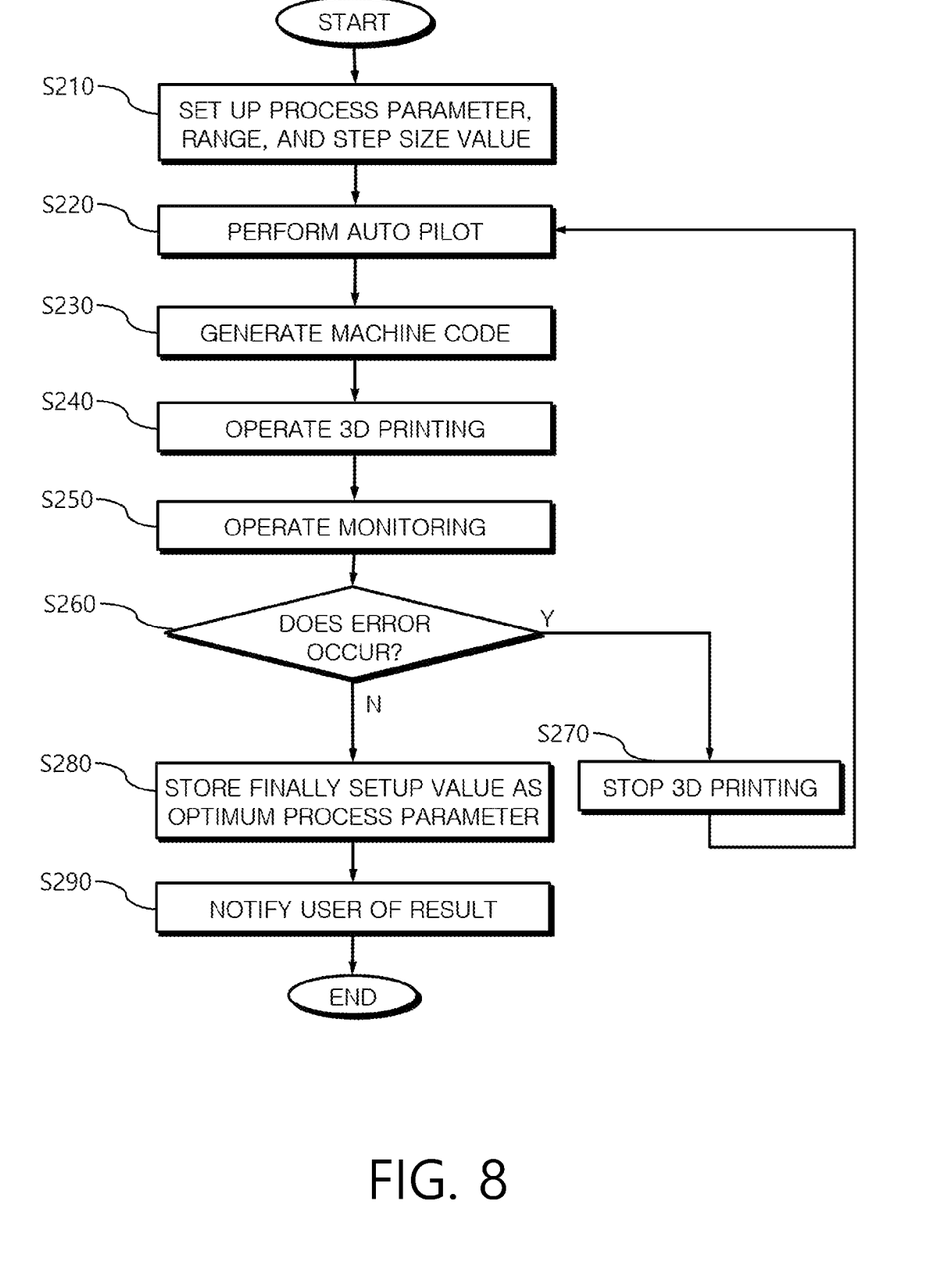
FIG. 8 is a flowchart provided to explain a machine learning process in a slicing step based on monitoring big data in detail.

FIG. 8 is a flowchart provided to explain a machine learning process at the slicing step based on monitoring big data in detail.

As shown in FIG. 8, a slicer SW module which becomes intelligent sets up a process parameter, a range, and a step size value for performing auto pilot "by itself" at the slicing step (S210).

For example, a layer thickness range may be automatically set to "0.3 mm to 1.0 mm" and a step size value may be automatically set to "0.05 mm"

Next, auto pilot is executed (S220) and a loop is operated according to the process parameter, the range, and the step size value inputted at step S210.

Specifically, a machine code is generated according to the corresponding process parameter (S230), 3D printing is operated by applying the generated machine code to 3D printing equipment (S240), and simultaneously, an output state of each layer is observed by monitoring (S250).

When an error occurs as a result of monitoring during output (S260-Y), 3D printing is stopped (S270) and step S220 is re-performed and the process parameter, the range, and the step size value are changed, and subsequent procedures are performed.

On the other hand, when an error does not occur as a result of monitoring during output, that is, when outputting succeeds (S260-N), the procedure escapes from the loop and a finally setup value is stored as an optimum process parameter (S280), and a final result is notified to the user (S290).

2.3 Modeling Feedback

Figure 9:
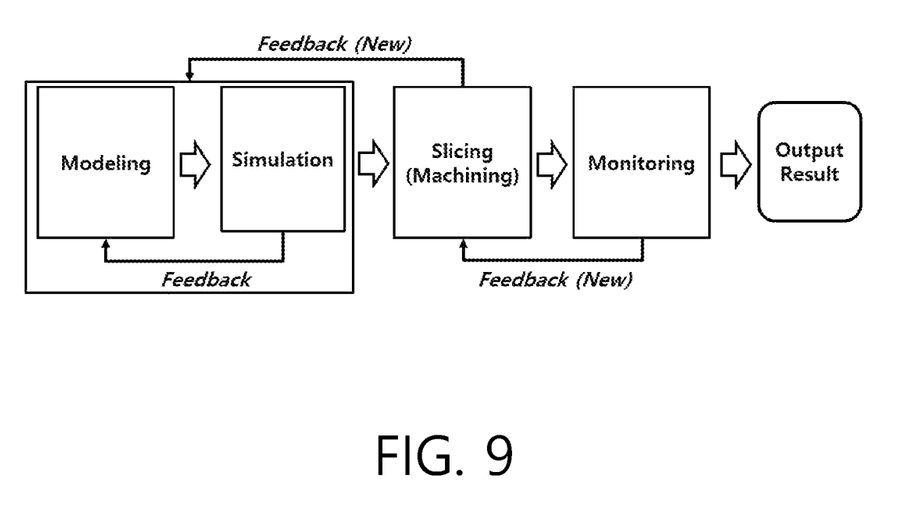
FIG. 9 is a view provided to explain a concept of modeling feedback.

Modeling feedback is a technical constitution for manufacturing intelligence. FIG. 9 is a view provided to explain a concept of modeling feedback.

As shown in FIG. 9, in addition to the machine learning step provided between the slicing step and the monitoring step as described in "2.2 Big Data Machine Learning," a feedback step is provided between the modeling step and the slicing step to perform a re-molding step regarding a matter that cannot be solved only by adjusting the process parameter of slicer SW, and to solve an error in the output.

A portion that is not solved in the slicer SW is corrected in modeling SW and is examined through a simulation prior to proceeding to the slicing step. Accordingly, through the present process, the error is gradually solved rather than spreading. To this end, an error caused by a 3D model input that is not appropriate to 3D printing can be solved, and thus "manufacturing intelligence" is possible.

Figure 10:
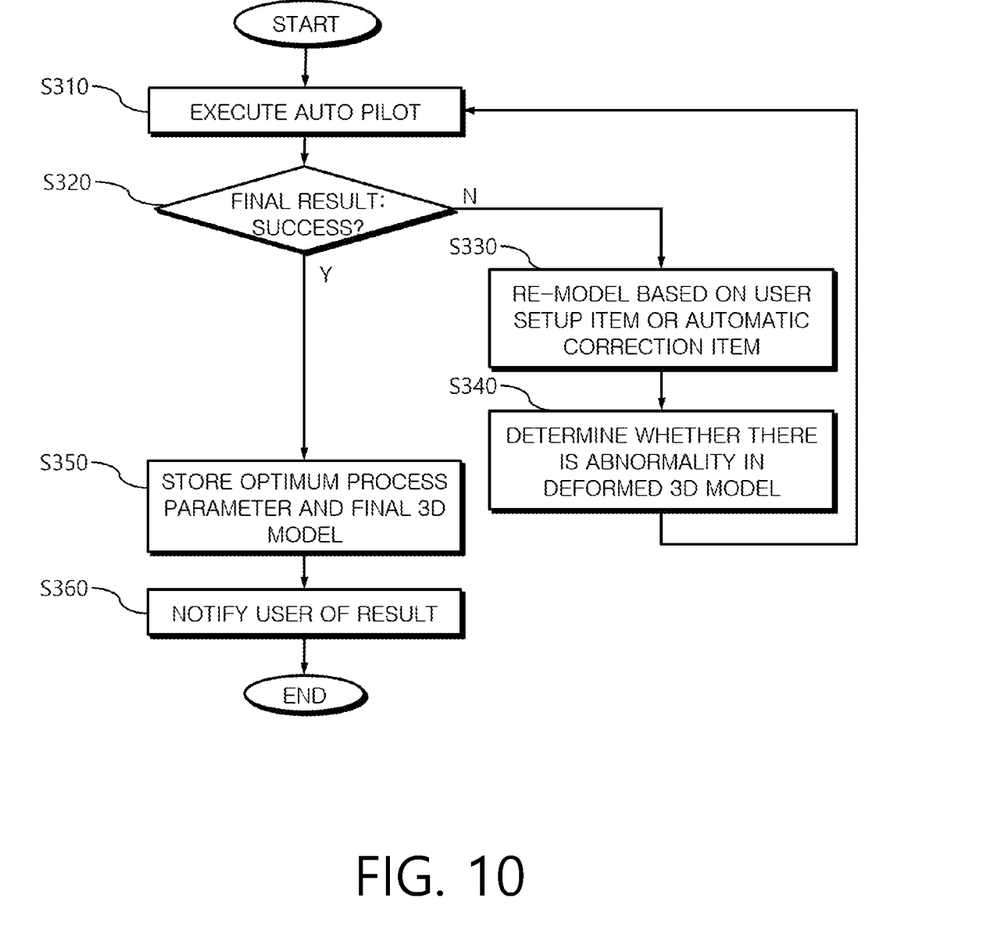
FIG. 10 is a flowchart provided to explain a modeling feedback process in detail.

FIG. 10 is a flowchart provided to explain a modeling feedback process in detail. As shown in FIG. 10, the slicer SW executes auto pilot first (S310), and, when a final result at step S310 is "failure" (S320-N), the procedure moves back to the modeling step to perform re-modeling.

To achieve this, there is a try to change an original 3D model in phases (deformation or re-modeling). Specifically, re-modeling (deformation) is performed based on an item set by the user or an automatic correction item (for example, non-support (self-supporting or support-less structure deformation)) (S330). Next, it is determined whether there is abnormality in the deformed 3D model through a simulation means (S340). This step is optional and may be omitted.

Thereafter, step S310 is re-performed based on the deformed 3D model. When a final result is "success" at step S310 (S320-Y), an optimal process parameter and a final 3D model are stored (S350), and a final result is notified to the user (S360).

3. Computing System for 3D printing.

Figure 11:
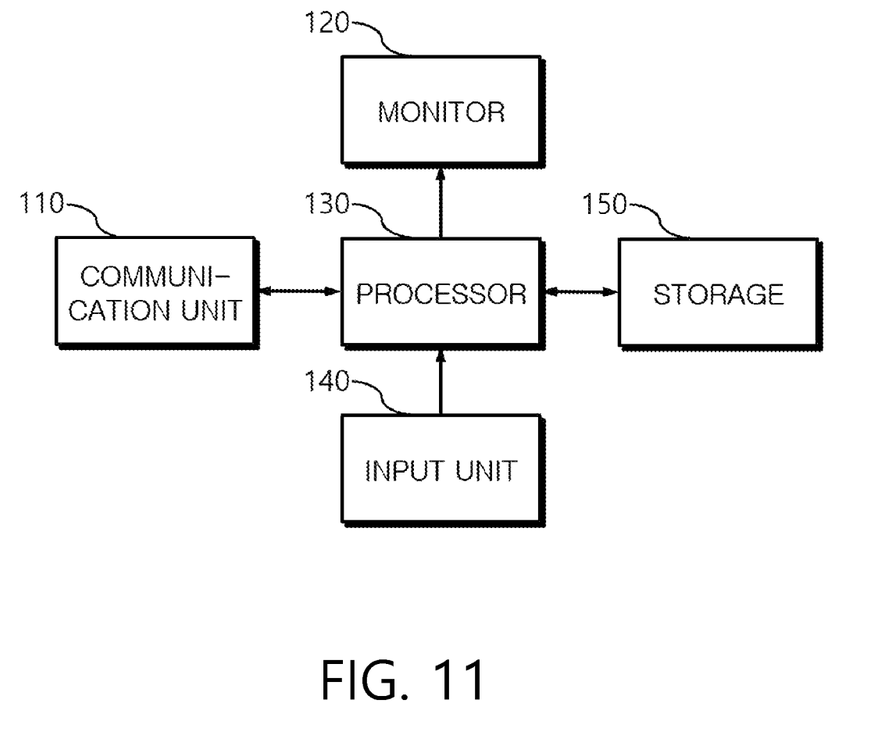
FIG. 11 is a block diagram of a computing system according to another embodiment of the present disclosure.

FIG. 11 is a block diagram of a computing system according to another embodiment of the present disclosure. The computing system according to an embodiment of the present disclosure includes a communication unit 110, a monitor 120, a processor 130, an input unit 140, and a storage 150 as shown in FIG. 11.

The communication unit 110 connects communication with 3D printer equipment, and transmits a G-code to the 3D printer equipment and receives a result of monitoring from the 3D printer equipment.

The monitor 120 is an outputting means through which a result of executing by the processor 130 is outputted, and the input unit 140 is an inputting means for receiving a user command and delivering the user command to the processor 130.

The processor 130 performs modeling, machining (slicing), and monitoring as described above, and in this process, generates a G-code file by performing monitoring feedback, big data machine learning, and modeling feedback.

The storage 150 provides a storage space necessary for the processor 130 to perform the above-described procedures/steps.

4. Variations

Up to now, the method for automatically enhancing 3D printing equality by monitoring feedback, big data machine learning, and modeling feedback has been described in detail through preferred embodiments.

The technical idea of the present disclosure may be applied to a computer-readable recording medium which records a computer program for performing functions of the apparatus and the method according to the present embodiment. In addition, the technical idea according to various embodiments of the present disclosure may be implemented in the form of a computer-readable code recorded on the computer-readable readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer-readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

The invention claimed is:

1. A 3D printing method, comprising:
setting up, using a machine-learning based slicer, a slicing environment for 3D printing for a 3D model being initially generated and modelled, the machine-learning based slicer being trained based on data collected through a previously performed setup step and a previously performed monitoring step;
generating a machine code by slicing dependent on the set-up slicing environment;
monitoring a status of 3D printing being performed by applying the generated machine code;
determining whether to re-perform the setting-up of the slicing environment while maintaining the initially generated 3D model, depending on a result of the monitoring;
determining whether to re-model the 3D model to generate a modified 3D model, depending on a result of the monitoring, including determining whether an erroneous matter or portion associated with the 3D printing is correctable by re-performing the setting-up of the slicing environment; and
performing a re-modeling of the initially generated 3D model to generate the modified 3D model rather than re-performing the setting-up of the slicing environment, depending on a result of the monitoring, in response to the matter being determined to be not correctable by re-performing the setting-up of the slicing environment.

2. The 3D printing method of claim 1, wherein the determining further includes determining to re-perform the step of setting up when an error occurs as a result of 3D printing.

3. The 3D printing method of claim 2, further comprising storing the slicing environment set-up at the step of setting-up as an optimum process setup when an error does not occur as a result of 3D printing.

4. The 3D printing method of claim 1, wherein the setting up further includes setting up at least one of a parameter, a range, and a step for slicing.

5. The 3D printing method of claim 1, wherein the re-modeling re-models the initially generated 3D model to generate the modified 3D model based on at least one of an item set by a user and an automatic setup item.

6. A computing system comprising:
a communication unit configured to connect communication with 3D printing equipment; and
a processor configured to:
set up, using a machine-learning based slicer, a slicing environment for 3D printing for a 3D model being initially generated and modelled, the machine-learning based slicer being trained based on data collected through a previously performed setup step and a previously performed monitoring step;
generate a machine code by slicing dependent on the set-up slicing environment;
monitor a 3D printing condition of the 3D printing equipment by applying the generated machine code;
determine whether to re-perform the setting-up of the slicing environment while maintaining the initially generated 3D model, depending on a result of the monitoring;
determine whether to re-model the 3D model to generate a modified 3D model, depending on a result of the monitoring, including determining whether an erroneous matter or portion associated with the 3D printing is correctable by re-performing the setting-up of the slicing environment; and
perform a re-modeling of the initially generated 3D model to generate the modified 3D model rather than re-performing the setting-up of the slicing environment, depending on a result of the monitoring, in response to the matter being determined to be not correctable by re-performing the setting-up of the slicing environment.

7. The computing system of claim 6, wherein, for the determining whether to re-perform the setting-up of the slicing environment, the processor is further configured to determine to re-perform the step of setting up when an error occurs as a result of 3D printing.

8. The computing system of claim 7, wherein the processor is further configured to store the slicing environment set-up at the step of setting-up as an optimum process setup when an error does not occur as a result of 3D printing.

9. The computing system of claim 6, wherein, for the setting up, the processor is further configured to set up at least one of a parameter, a range, and a step for slicing.

10. The computing system of claim 6, wherein, for the re-modeling, the processor is further configured to perform the re-modeling of the initially generated 3D model to generate the modified 3D model based on at least one of an item set by a user and an automatic setup item.

* * * * *